United States Patent [19]

Hoskins et al.

[11] Patent Number: 4,581,780
[45] Date of Patent: Apr. 15, 1986

[54] PRECAST CONCRETE TOILET WITH VENT

[76] Inventors: Jeffrey L. Hoskins; Gregory L. Hoskins, both of P.O. Box 1027, Blackfoot, Id. 83221

[21] Appl. No.: 727,795

[22] Filed: Apr. 26, 1985

[51] Int. Cl.⁴ .............................................. A47K 11/03
[52] U.S. Cl. ............................................ 4/475; 4/459; 4/460; 4/211; 4/209 R; 4/DIG. 7
[58] Field of Search .................... 4/475, 209, 460, 661, 4/461, 462, 472, 474, 477, 482, 524, 526, 347, 211, DIG. 7, 449; 52/21, 128

[56] References Cited
U.S. PATENT DOCUMENTS

| | | | |
|---|---|---|---|
| 273,439 | 3/1883 | Bauer et al. | 4/475 |
| 1,071,073 | 8/1913 | Mershon | 4/475 |
| 1,267,401 | 5/1918 | Greene | 4/475 |
| 1,415,719 | 5/1922 | Shollenberger | 4/475 |
| 1,567,414 | 12/1925 | Bogart | 4/475 |
| 2,520,657 | 8/1950 | Reid | 4/475 |
| 3,066,311 | 12/1962 | Tharp | 4/462 |
| 3,975,780 | 8/1976 | Bowen et al. | 4/211 |
| 4,305,164 | 12/1981 | Sargent et al. | 4/460 X |

Primary Examiner—Henry K. Artis
Attorney, Agent, or Firm—Harvey B. Jacobson

[57] ABSTRACT

An outdoor toilet constructed of precast concrete having integral color incorporated therein with the external surfaces being simulative of wood or the like and provided with a vault with a vent stack extending upwardly along one wall of the toilet and communicating with the vault and with a vent cap on the roof of the toilet to provide an offset passageway for venting the vault by using the chimney effect of the vent stack and vent cap. The vent stack includes an access opening in the exterior wall thereof provided with a closure to enable pump out of the vault from a point externally of the toilet. The toilet includes a toilet riser, handrail, toilet tissue holder, window and louver vents and an access door associated with an entrance slab and screen panels along two edges of the entrance slab to prevent direct observation into the interior of the toilet when the door is open. The entrance slab is supported by cantilever arms integral with the vault at one end edge thereof.

11 Claims, 4 Drawing Figures

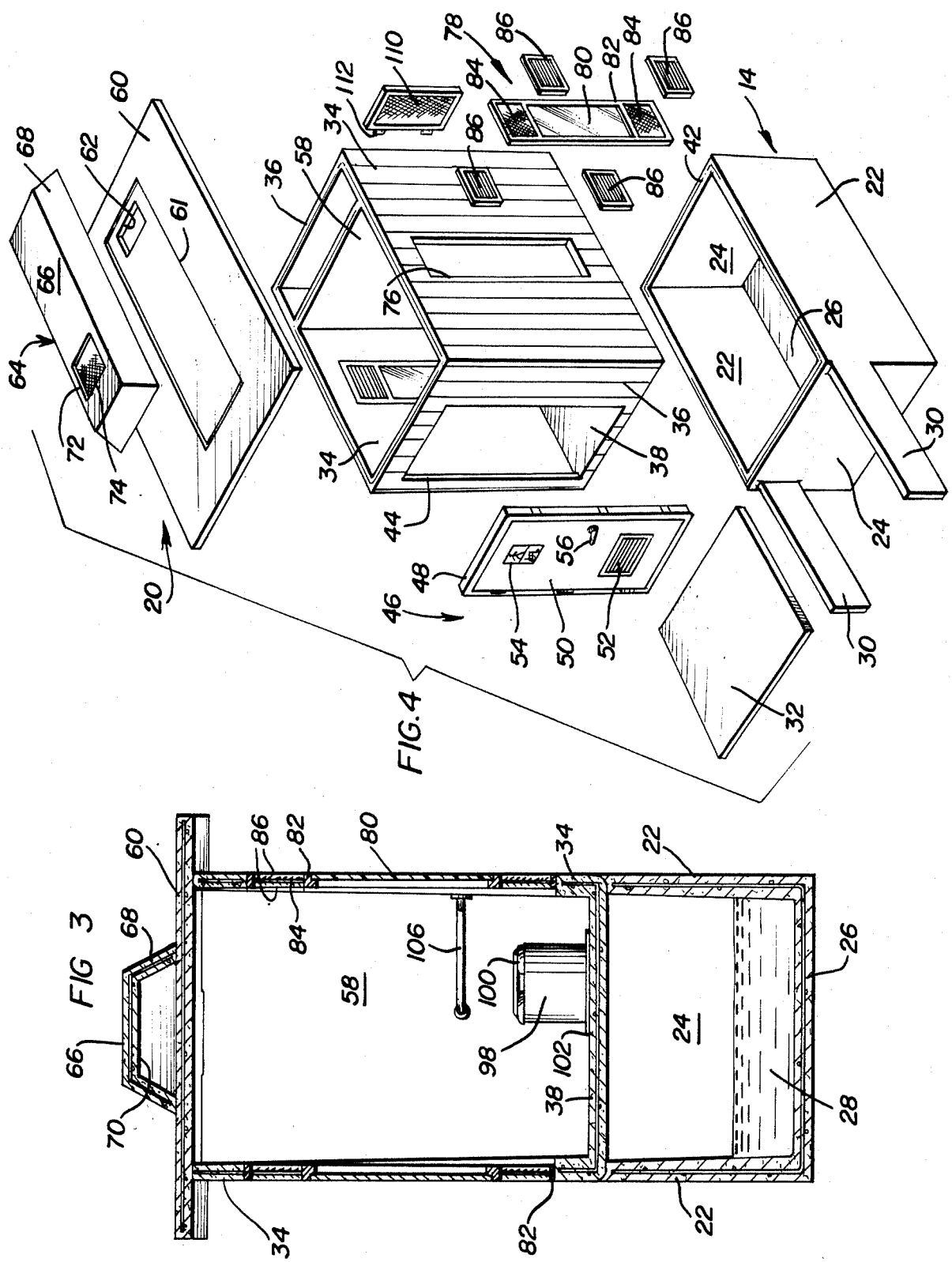

PRECAST CONCRETE TOILET WITH VENT

BACKGROUND OF THE INVENTION

1. Field of the Invention

The present invention generally relates to outdoor toilets and more specifically a toilet constructed throughout of precast concrete having a unique vent system for the vault which extends upwardly throughout the width of the rear wall of the toilet and forwardly along the upper surface of the roof. The toilet building includes a unique structure enabling pump out of the vault from the exterior of the toilet building with the vent stack being used as part of the structure to facilitate pump out accessibility. The toilet includes cantilever arms on the vault to support an entry slab and entrance screen walls with the structure enabling reduced maintenance with the interior being painted in epoxy paint with integral color components throughout and handicap accessibility is also provided.

2. Information Disclosure Statement

Outdoor toilets have been constructed of various materials and with various structural features over the years with such toilets being constructed of concrete and provided with various vent arrangements and access openings for clean out. The following U.S. Patents exemplify the development in this field of endeavor:

109,160, W. J. Warren, Nov. 8, 1870;
273,439, B. Bauer et al, Mar. 6, 1883;
1,096,490, A. R. Clark, May 12, 1914;
1,105,237, B. J. Ashley, July 28, 1914;
1,334,192, W. E. Thomas et al, Mar. 16, 1920;
1,780,099, G. Van Steenburg, Oct. 28, 1930;
3,106,044, A. Di Tullio et al, Oct. 8, 1963;
3,546,718, C. A. Minnitte, Dec. 15, 1970.

SUMMARY OF THE INVENTION

An object of the present invention is to provide an outdoor toilet building or structure of precast concrete components with integral color and surface finish and including a vent stack incorporated into the rear wall and roof of the structure.

Another object of the invention is to provide an outdoor toilet in accordance with the preceding object in which the vent stack extends completely across an end wall of the structure with the vent stack being communicated with the vault and provided with a vault clean out opening in the end wall of the vent stack to facilitate access to the interior of the vault from the exterior of the building structure for clean out or pump out of the vault without personnel requiring access to the interior of the building structure.

A further object of the invention is to provide a precast concrete toilet including an exterior entrance slab supported by a pair of cantilever support beams or arms formed integrally with the vault with the slab including entrance screen walls for the openable door so that handicapped persons including those in wheelchairs can easily gain access to the interior of the toilet structure.

Still another object of the invention is to provide a toilet structure constructed of precast concrete components which are reinforced and will require very little maintenance as compared to wood structures or other structures used in constructing outdoor toilets with the structure being long lasting, not subject to attack by termites, effective to exclude insects and provides an effective chimney effect for venting odors from the vault and also enables efficient and readily accessible pump out facilities for cleaning out the vault periodically without the clean up personnel having access to the interior of the toilet structure.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a transverse, sectional view taken substantially upon a plane passing along section line 3—3 on FIG. 2 illustrating further structural details of the outdoor toilet.

FIG. 4 is an exploded group perspective view of the components of the outdoor toilet with the external screen walls omitted.

DESCRIPTION OF THE PREFERRED EMBODIMENT

Figure 2:
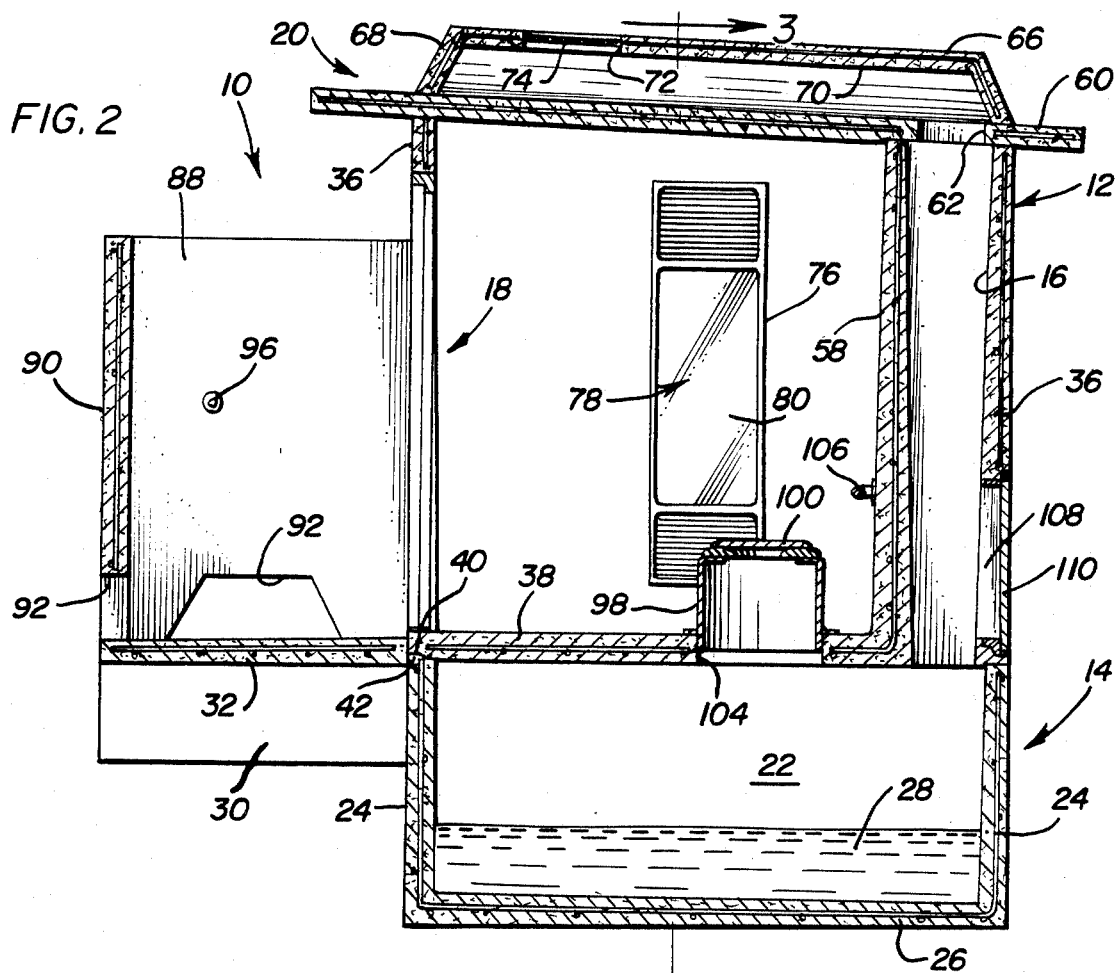
FIG. 2 is a longitudinal, vertical sectional view of the outdoor toilet.
Figure 1:
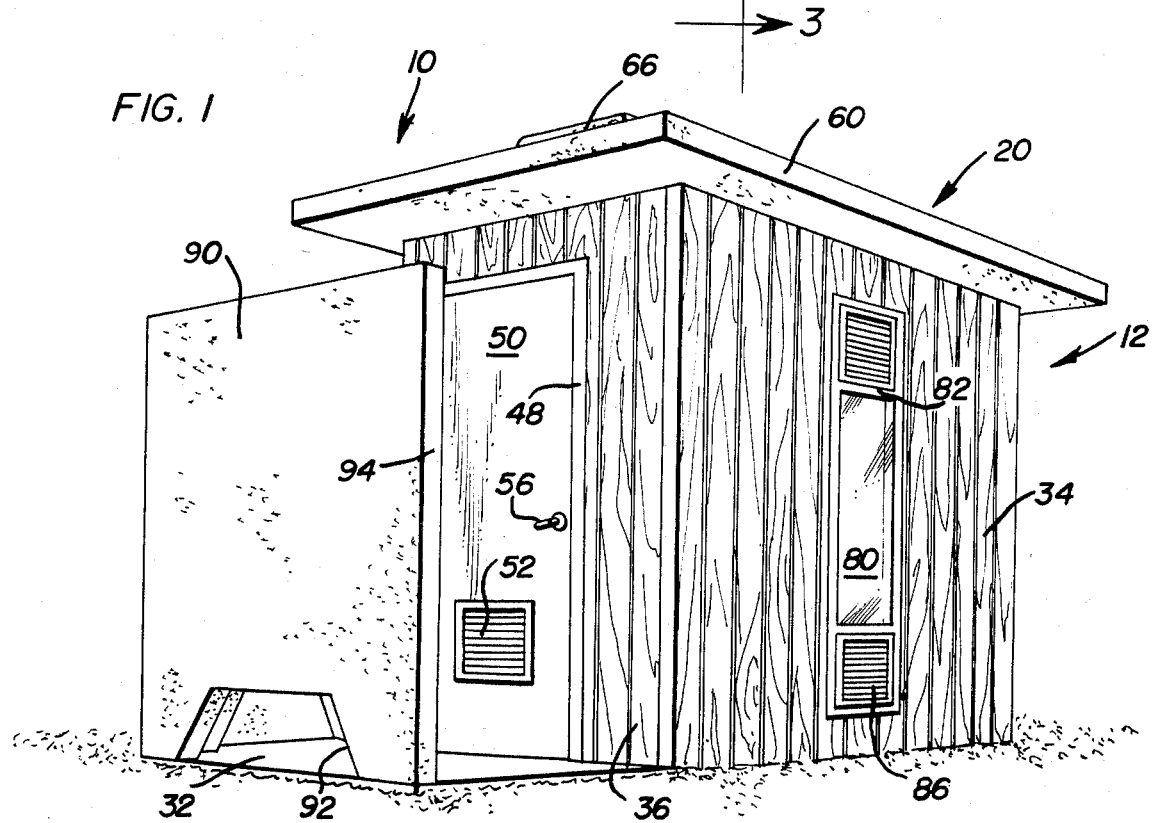
FIG. 1 is a front perspective view of the outdoor toilet of the present invention.

Referring now specifically to the drawings, the outdoor toilet of the present invention is generally designated by numeral 10 and includes a building structure generally designated by numeral 12 and including an underground vault 14 underlying the building structure, a vent stack 16 incorporated into one end wall, an entrance door generally designated by numeral 18 in the other end wall, and a roof structure generally designated by numeral 20 which includes a vent assembly described in more detail hereinafter.

The building structure 12 and its various components are constructed of precast reinforced concrete. The underground vault 14 includes sidewalls 22 and end walls 24 oriented in perpendicular relation to each other and a bottom wall 26 forming a closure for the bottom of the vault with the dimensions of the vault being sufficient to provide a predetermined capacity for liquid and other waste material 28 with the vault being waterproof to prevent discharge of liquid material through the walls from the interior of the vault 14 into the ground surface and also preventing ingress of water from the ground surface into the vault. The vault structure is constructed of concrete with reinforcing incorporated therein in a conventional manner with the concrete material being conventional and capable of being formed in molds as a monolithic, one-piece structure.

Projecting outwardly from one end wall 24 and in alignment with the sidewalls 22 is a pair of support beams or arms 30 which are precast with the vault and are reinforced to provide a support for a rectangular entrance slab 32. As illustrated in FIGS. 2 and 4, the upper edges of the cantilever arms 30 are spaced slightly below the upper edge of the end wall 24 to provide a stop edge for the entrance slab 32. Positioned on top of and forming a closure for the vault 14 is the building structure including a pair of parallel sidewalls 34 and parallel end walls 36 with the end walls 36 being perpendicular to the sidewalls 34. The walls 36 and 34 are provided with a bottom slab 38 which rests on and forms a closure for the vault 14. The corner juncture between the walls 34 and 36 with the floor slab or panel 38 is externally curved and provided with an offset notch 40 receiving a correspondingly shaped offset projection 42 on the upper edge of the vault walls 22 and 24 to provide a key for alignment and a seal arrangement with mastic or other sealant is provided in the joint if desired.

As illustrated in FIGS. 3 and 4, the front end wall 36 is provided with an opening 44 receiving a door assembly generally designated by the numeral 46 which includes a metal frame 48 and metal door 50 which are commercially available items provided with a louvred vent opening 52 in the bottom portion thereof which is provided with an insect screen to enable air circulation. Also, signs may be provided on the doors indicated by numeral 54 and a privacy lock set with lever handles 56 may also be provided on the door in a conventional manner. When installed, the entrance slab 32 has an upper surface generally coplanar with the upper surface of the floor 38 or spaced slightly below that surface to preclude entry of water in the event of rain standing on the upper surface of the entrance slab 32.

The other end wall 36 has the vent stack 16 incorporated therein which is defined by a partition wall or inner wall 58 spaced from the end wall 34 as illustrated in FIGS. 2 and 4. The partition wall 58 parallels the end wall 36 and extends between the sidewalls 34 so that the vent stack 16 extends vertically through the floor panel 38 so that it communicates with the vault 14 adjacent one of the end walls 24 as illustrated in FIG. 2. Also, as illustrated in FIG. 2, the interior surfaces of the partition wall and the end wall are inclined slightly to enable the partition wall 58 to be precast in the form with the walls 34 and 36 so that all of the walls and the partition along with the floor panel are of one-piece monolithic reinforced concrete structure. Also, as illustrated, the top edges of the sidewalls incline forwardly and upwardly slightly and the top edges of all of the walls 34, 36 and the partition 58 terminate in a single inclined plane to receive and support a roof panel 60 which projects laterally outwardly on each side and to the front and rear of the building structure to protect the sidewalls and end walls to some extent from rain or other inclement conditions and to provide some shade for those areas of the periphery of the building underlying the projecting eve or soffit. The rear portion of the roof panel 60 is provided with a vent opening 62 that is in alignment with and in communication with the vent stack 16. Mounted on top of the roof panel 60 is a vent cap 64 of reinforced concrete that includes a relatively narrow top wall 66 and downwardly inclined side and end walls 68 which are supported and sealed to the roof panel 60 by seal strip 61 with the downwardly facing hollow interior 70 of the vent cap 64 communicating with the vent opening 62 as illustrated in FIG. 2. The forward end of the top wall 66 of the vent cap 64 is provided with a vent opening 72 having an insect screen 74 therein which communicates the interior of the vent cap with the atmosphere so that the vault is vented through the vent stack 16, opening 62, passageway 70 and opening 72 thereby providing a chimney effect for venting odors from the vault 14 to the atmosphere with the chimney effect being enhanced by installing the unit with the slanted roof facing the south for greater sun exposure.

Each sidewall 34 of the building structure is provided with an opening 76 receiving window and vent assembly 78 which includes a translucent panel 80 of unbreakable material such as a plastic material sold under the trademark "Lexan". The panel 80 includes a peripheral frame 82 which also receives an insect screen 84 and a vision proof louver panel 86 interiorly and exteriorly thereof with the screen and louver assembly being positioned at each end of the frame 82 and at each end of the translucent panel 80 as illustrated in FIGS. 2 and 4.

The front end wall 36 is provided with an outwardly extending vertical panel or screen wall 88 which forms an extension of the sidewall 34 having the hinge edge of the door adjacent thereto. Extending from the outer edge of the wall or panel 88 is a second panel 90 which is parallel to the end wall 36 and each of the panels 88 and 90 is provided with a recess 92 in the lower edge thereof with the portions of the bottom edges outwardly of the recesses 92 being supported on and joined to the entrance slab 32 thus forming a screen for the door and requiring that the building structure be entered laterally through the entrance opening defined by the free edge of the wall 90, as designated by numeral 94 and the adjacent end wall 36. The panels or walls 88 and 90 serve as a vision screen to prevent observation of the interior of the toilet structure when the door is open. A bumper 96 is provided in the wall or panel 88 to engage the handle structure on the door to prevent damage thereto.

The interior of the toilet structure 12 is provided with a toilet riser 98 provided with a seat and lid assembly 100 and a bottom flange 102 which sealingly engages the floor 38 in enclosing relation to an opening 104 in the floor panel 38 which is offset toward one side and toward the rear of the enclosure formed by the walls with the riser being in alignment with that portion of the front end wall 36 having the free swinging edge of the door adjacent thereto to further aid in preventing observation of persons using the toilet riser from exterior of the toilet structure. A handrail 106 is mounted on the interior of the sidewall 34 and partition wall 58 alongside of and to the rear of the toilet riser 98 and toilet paper holders may be supported at the forward end of the handrail.

The rear end wall 36 is provided with an access opening 108 adjacent the lower end thereof where the end wall 36 joins with the end wall 24 of the vault 14. A plate-like cover or closure 110 is provided in the opening 108 with the closure member 110 being hingedly mounted at one side edge thereof by hinges 112 and provided with bolt or other fastening devices at the opposite side to maintain the closure in closed position but enabling the closure to be opened when desired to provide access to the vent stack and to the vault 14 to enable the material 28 in the vault 14 to be pumped out through the access opening 108 without personnel having access to the interior of the building structure 12 and also eliminating unsanitary conditions which occur when a vault is pumped out through the toilet riser as is the conventional practice. Thus, the vent stack 16 and the partition 48 spaced from the end wall 36 provides for effective venting of odors from the vault and also provides access to the vault through the rear end wall 36 for pumping out or cleaning the vault 14 without introducing unsanitary conditions into the interior of the building structure and without the clean out personnel having access to the interior of the building structure.

As illustrated, the signs may be placed on the door 50 or may be placed on the screen wall 90.

The toilet riser is preferably constructed of polyethylene and is provided with a heavy duty seat and cover assembly and fits tightly and sealingly in the hole provided therefor in the floor slab. The handrail or grab bars are preferably stainless steel and have a 1½ inch outside diameter with a 1½ inch wall clearance. The toilet paper holder may be of conventional construction and provided with a key lock or the like to prevent removal but enable resupply of the toilet tissue. The wall bumper is a commercially available item with a rubber insert to prevent damage to the lever operated door latch. The louvers each include a two-piece unit with an insect screen therebetween with the louver units in the door and windows being interchangeable. The metal door, door frame and window frame and the reinforced colored concrete as well as the louvers and window units provide many years of maintenance free use. The concrete components are integrally colored with a wide range of color choices available with the exterior of the walls simulated wood planks if desired and the screen walls 88 and 90 have an agregate exterior surface, or other textures if desired. The interior walls of the structure are coated with a gloss epoxy concrete enamel with the interior of the walls and roof preferably being white and the floor being grey and provided with anti-skid sand to provide a non-skid surface and the exterior of the vault may be coated with a waterproofing agent such as coal tar or the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An outdoor toilet comprising a vault in the form of a receptacle having an open top, a building structure mounted on the open top of the vault and including vertical walls, a bottom panel and a roof panel, one wall of the building structure including an access doorway and door, another wall of the building including a vent stack incorporated therein having a lower end communicated with the vault, the roof panel including a vent cap extending longitudinally thereof and including an end portion in communication with the vent stack and a vent opening in spaced relation to the vent stack to provide an offset in the path of air venting from the vault to the atmosphere above the roof to provide a chimney effect for venting the vault.

2. The outdoor toilet as defined in claim 1 wherein said floor panel includes an opening communicated with the vault and a toilet riser mounted in the opening and projecting above the floor panel to enable the toilet facilities to be used.

3. The outdoor toilet as defined in claim 2 wherein said vent stack is formed by a wall of the building structure and a partition wall parallel thereto and extending throughout the width, length and height of the building wall to provide a vent stack extending completely across one dimension of the vault and building structure to provide a chimney effect for venting the vault.

4. The outdoor toilet as defined in claim 3 together with an access opening through the wall of the building structure forming the vent stack with the opening disposed adjacent but above the vault to enable the vault to be pumped out from a point externally of the building structure, and a closure for the opening to prevent access thereto except when it is desired to pump out the vault.

5. The outdoor toilet as defined in claim 4 together with an entrace slab extending outwardly from the doorway, said vault including cantilever supported arms projecting from one end thereof to support the entrance slab in alignment with the bottom panel of the building structure.

6. The outdoor toilet as defined in claim 5 together with screen walls mounted along a side and end edge of the entrance slab to shield the interior of the building structure from observation when the door is open.

7. The outdoor toilet as defined in claim 6 wherein opposed vertical walls include a translucent window and a screen and louver vent assembly.

8. The outdoor toilet as defined in claim 7 together with handrails mounted interiorly of adjacent walls of the building structure in adjacent relations to but spaced upwardly from the upper end of the toilet riser.

9. The outdoor toilet as defined in claim 8 wherein said door and doorway are offset toward an adjacent perpendicularly arranged wall, said toilet riser being positioned inwardly of and laterally of the doorway.

10. The outdoor toilet as defined in claim 9 wherein the vault, building structure, roof panel, vent cap, entrance slab and screening walls are all constructed of precast, reinforced concrete.

11. The outdoor toilet as defined in claim 1 wherein the vault and all components of the building structure are constructed of precast reinforced concrete.

* * * * *